United States Patent [19]

Williams et al.

[11] Patent Number: 4,751,505

[45] Date of Patent: Jun. 14, 1988

[54] OPTICAL MOUSE

[75] Inventors: Lisa M. Williams; Robert S. Cherry, both of Redondo Beach, Calif.

[73] Assignee: Xerox Corporation, Stamford, Conn.

[21] Appl. No.: 877,045

[22] Filed: Jun. 23, 1986

[51] Int. Cl.[4] .............................................. G09G 1/00
[52] U.S. Cl. ..................................... 340/710; 178/18; 250/221
[58] Field of Search ...................... 340/706, 709, 710; 250/221, 237 R; 178/18, 19, 20

[56] References Cited

U.S. PATENT DOCUMENTS

| | | | |
|---|---|---|---|
| 4,022,969 | 5/1977 | McKinlay et al. | 340/710 |
| 4,092,532 | 5/1978 | Hayes | 340/710 |
| 4,303,914 | 12/1981 | Page | 340/710 |
| 4,354,102 | 10/1982 | Burns et al. | 340/710 |
| 4,390,873 | 6/1983 | Kirsch | 340/710 |
| 4,409,479 | 10/1983 | Sprague et al. | 340/710 |
| 4,631,400 | 12/1986 | Tanner et al. | 340/710 |
| 4,686,329 | 8/1987 | Joyce | 340/710 |

FOREIGN PATENT DOCUMENTS 2154734 9/1985 United Kingdom ............... 340/710

Primary Examiner—Gerald L. Brigance
Assistant Examiner—Mahmoud Fatahi-yar
Attorney, Agent, or Firm—Franklyn C. Weiss

[57] ABSTRACT

An optical mouse 100 wherein light emanating from the light source 106 is reflected off an optical pattern pad and is placed such tha a lens 120 at a predetermined distance from the optical pad focuses the light directly onto an inverted integrated circuit 124 mounted on and through a hole 126 in a printed wiring board 118, the integrated circuit being housed in a clear plastic package. The path from the lens to the integrated circuit package provides an optical guide 122 such that the distances from the pattern pad to the lens, and from the lens to the optical sensor 128 in the integrated circuit, is fixed upon manufacture and assembly without any further optical adjustment. The inverted state of the integrated circuit chip allows a fixed distance to be provided through the hole in the printed wiring board rather than from above it as is common in the prior art.

1 Claim, 2 Drawing Sheets

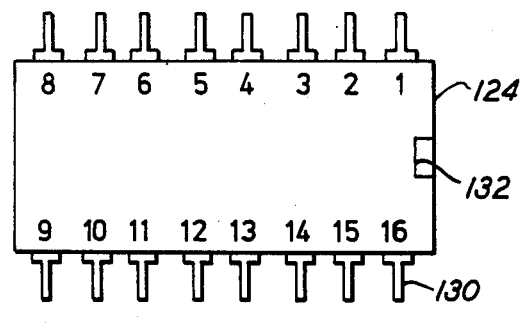
FIG. 1A  STANDARD PACKAGE PINOUT
PRIOR ART
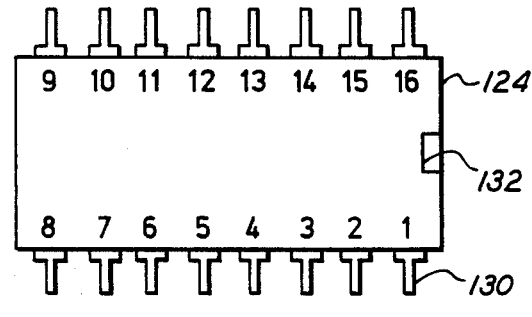
FIG. 1B  INVERTED PACKAGE PINOUT
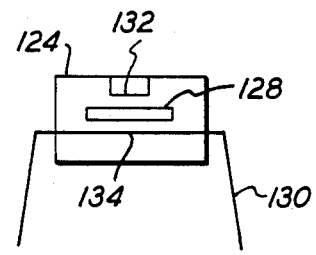
NORMAL BEND
PRIOR ART
FIG. 2A
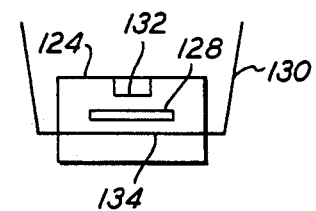
NORMAL BEND
FIG. 2B

OPTICAL MOUSE

This invention relates to a cursor conrol device, otherwise known as an optical mouse, for use with an interactive display oriented computer system to provide movement for a visible cursor from position to position on a display screen of such a system. The device includes an optically sensitive integrated circuit chip which is mounted into a printed wiring board in an inverted state which, in conjunction with a straight optical path from a pattern pad, provide electrical signals for use by subsequent digital circuitry.

BACKGROUND OF THE INVENTION

U.S. Pat. No. 4,521,772, which issued on June 4, 1985, discloses a cursor control device, or "optical mouse" for use with an interactive display oriented computer system to provide movement for a visible cursor from position to position on a display screen of such a system. The device include an IC (intetrated circuit) chip that contains on optical sensor array and circuitry to bring about detectable bit maps based upon a plurality of sensor cells making up the array. the distinguishable bit maps are employed as a means for comparison to provide an output indicative of the direction and amount of movement of the cursor control device relative to an optical contrasting input to the array, the output being employed as a means to move the visible cursor from position to position on a display screen.

U.S. Pat. No. 4,521,773, also issued on June 4, 1985, and assigned to the same assignee as the previous patent and the present application, discloses an imaging array which provides a plurality of distinguishable bit map images and comprises an array of sensor cells capable of sensing radiation. The cells are connected in a manner to form distinguishable bit map images through a pattern of correspondence among the cells. Each bit map image formed comprises a combination of one or more cells indicative of detecting an image pixel within a field of array cells that have been non-indicative of such detection. The pattern of correspondence may be one of inhibition of the operation of other cells in the array or one of indication of operation to other cells in the array. Various patterns of correspondence can be created among the cells creative of bit map images. Bit map images may consist of combinations of responsive cells within a field of nonresponsive cells in the array. For example, each bit map image may comprise radiation responsive array cells that have sensed a sufficient quantity of radiation within a field of cells which have not sensed radiation or have been inhibited from sensing radiation. On the other hand, each bit map image may comprise cells that have not sensed a sufficient quantity of radiation within a field of cells that have sensed a sufficient quantity of radiation. An application of the imaging array is in an IC chip for a cursor control device or an "optical mouse" for use with an interactive display oriented computer system to provide movement for a visible cursor from position to position on a display screen of such a system.

The optical mouse as disclosed in these two patents were operative as disclosed but found to have a difficulty in the focus alignment for the light reflected from the illuminated pattern pad to the optical sensor array on the integrated circuit chip. Improvement was necessary and work was undertaken to create an optical mouse which did not include the folded optics as disclosed in the two patents set forth above.

According to the present invention, an optical mouse is disclosed wherein light emanating from the light source is reflected off an optical pattern pad and is placed such that a lens at a predetermined distance from the optical pad focuses the light directly onto an inverted integrated circuit mounted on and through a hole in a printed wiring board, said integrated circuit being housed in a clear plastic package. The path from the lens to the integrated circuit package provides an optical guide such that the distances from the pattern pad to the lens, and from the lens to the optical sensor in the integrated circuit, is fixed upon manufacture and assembly without any further optical adjustment. The inverted state of the integrated circuit chip allows a fixed distance to be provided through the hole in the printed wiring board rather than from above it as is common in the prior art.

DESCRIPTION OF THE DRAWINGS

For a more complete understanding of the invention, reference may be had to the following detailed description of the invention in conjunction with the drawings wherein:

FIG. 1a is the top view of a standard integrated circuit package indicating pin placement and numbering thereof, while FIG. 1b is the pin placement of the reversed, i.e., inverted, integrated circuit package and its pin placement, and numbering as utilized in the present invention;

FIG. 2a shows an integrated circuit wherein an optical sensor array is placed in the integrated circuit and its normal pin placement and bending thereof in relation to the optical sensor; while FIG. 2b shows the reverse bend to an integrated circuit with such an optical sensor array such that when the integrated circuit is reversed and placed into a printed wiring board, the optical sensor array is always at a predetermined fixed distance from the integrated circuit package to the printed circuit board.

DETAILED DESCRIPTION OF THE INVENTION

Figure 3:
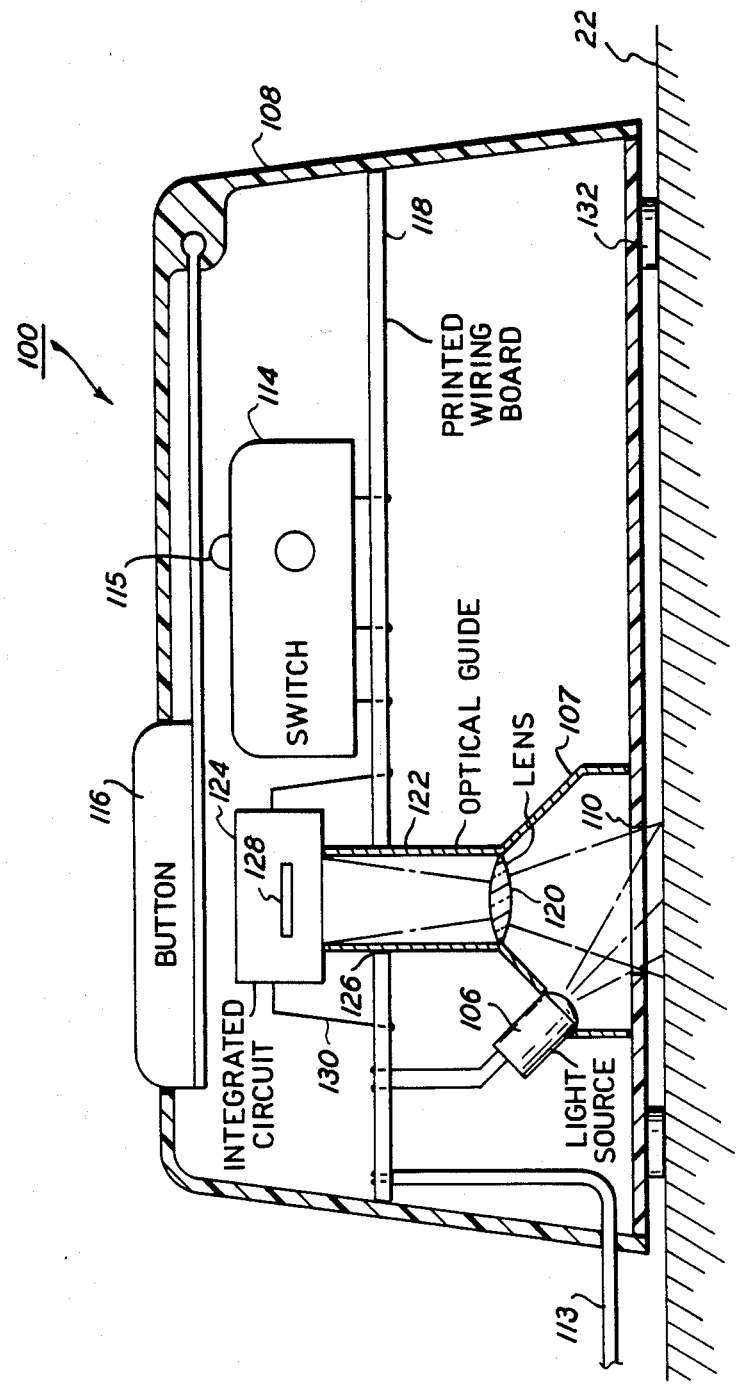
FIG. 3 is a diagrammatic illustration of an optical mouse comprising the present invention utilizing a lens, an optical guide, and a reverse bent, inverted circuit package.

As is fully set forth in U.S. Pat. Nos. 4,521,772 and 4,521,773, described above, an optical mouse is a hand held cursor positioning unit with an overall weight of approximately three ounces. Its outputs are digital signals related to its positional change as it is moved over a pattern pad. Two or three or more button switches can be provided on top of the optical mouse for the operator to make functional selections. The optical mouse can interface with a host system via a multi-wire cable assembly.

The optical mouse detects motion across a defined pattern pad by means of optical sensors and converts this motion to x and y pulse train outputs. The direction and speed of the motion is contained in the phase shift and frequency of the output signals which is decoded and utilized in displaying the cursor on a screen such as a cathode ray tube of a personal computer or workstation. At various times, the push buttons which operate microswitches within the optical mouse itself, can be utilized for certain functions on the surface of the screen of the cathode ray tube. For example, depressing the left button when the cursor is below and to the left of the left hand most letter of a word and the moving the mouse to the right hand most letter of a word and then depressing the right hand button of an optical mouse, can cause the highlighting of the word on the cathode ray screen for delection thereof, or changing of the font or the size of the letters within the font, for example. Also, depression of one or the other switches can institute an action on the screen such as a printing function or a deletion function when the cursor is over a predetermined place on the screen as may be necessary.

One disadvantage of the optical mouse set forth in the cited two patents is the fact that a reflecting mirror comprising folded optics is necessary and alignment thereof is required during the manufacture and assembly process. The alignment of the optical system is labor intensive and therefore expensive, to say nothing of the fact that folded mirror optics themselves must also be provided. The present invention herein solves several problems in that when the entire unit is assembled during manufacture, no further mechanical or optical alignment is necessary in order for all the optical equipment and components thereof to be in their operational state.

FIG. 3 of the present application shows a side view of the optical mouse in accordance with the principles of the present invention. The optical mouse 100 is shown to be covered by housing 108. This can be of molded plastic of any of the well known types in the prior art. The major components of the optical mouse are seen to be the button 116, which operates microswitch 114 via the operating point 115. There could be two or even three or more of these buttons and microswitches depending on the choice of the system and the required operations. Normally, two or three microswitches and accompanying buttons are utilized, as more than two or three becomes confusing to an operator and adds to the complexity of the printed wiring board 118. The switch 114 would be mounted in holes in the printed wiring board 118. Not shown on the printed wiring board 118 are other electrical components, such as resistors and capacitors and connectors which are necessary for the operation of the circuit but form no part of the present invention. Light source 106 is included which is mounted in a housing 107. Lens 120 is shown installed in the optical guide 122 which fits through a hole 126 in the printed wiring board 118. The light would shine upon the optical sensor array 128 as seen in FIG. 3. The configuration of integrated circuit 124 will be discussed hereinafter in relation to FIGS. 1 and 2.

In operation, therefore, the light source 106 would be utilized to shine its light towards hole 110 in the bottom part of the cover 108 of the optical mouse 100. The light source 106 could be a light emitting diode which could emit light in the visible or the infrared region depending upon the sensitivity of the optical sensor array 128 mounted in the integrated circuit 124. There could be one, two, or even three of these light emitting sources 106 mounted in housing 107 depending upon the sensitivity of the optical sensor array 128 and whether or not redundant light sources are desired by the designer. Only one light source 106 is necessary, however, for the principles of the present invention. As the light strikes the pattern on pad surface 22, light and dark shadows are reflected from the surface, some of which are focused by lens 120 through optical guide 122 onto the optical sensor array 128. The operation of the pattern on surface 22 and the meaning of the various signals as detected thereby are fully covered in the two patents set forth above. Because the light source 106 is mounted in housing 106, and lens 120 is situated at the end of the optical guide 122, which extends through the hole 126 in printed wiring board 118, and that the integrated circuit 24 fits as close to the optical guide as can be made depending upon the length of the leads as bent in reverse direction, the manufacture of the optical mouse is made simple by the fact that no optical alignment or measurement is necessary subsequent to the assembly of the parts of the present optical mouse.

The integrate circuit 124 is unique in its manufacture and its implementation in the present invention. FIG. 1a shows the pin numbering of a standard integrated circuit package with the pin number 1 in the upper right hand corner if viewed from the top. The alignment indentation is between pins 1 and 16. It is in this top surface that prior art integrated circuits would have its optical senor array. However, the integrated circuit package of the present invention has been reversed and inverted to allow the top surface to become the bottom surface so as to allow for immediate alignment of the bottom surface thereof when the integrated circuit package is mounted in its housing in the optical mouse. FIG. 1b shows the inverted package pinout as would be the case for the integrated circuit of the present invention. Since the pins are reversed in its inverted state, care must be made to note where the pins are in the wiring process of the design of the printed wiring board.

FIG. 3 shows the integrated circuit 124 sitting on top of the optical guide 122 which acts as the spacer from the lens 120 to the optical sensor array 128. However, the optical guide could be shorter above the hole 126 in the printed wiring board which could allow for the pins of the integrated circuit to establish the height above the board in which the optical sensor array sits, in that most integrated circuits have a wider dimension to the pins as they immediately extend out from the body of the integrated circuit which narrows down to a less wide dimension in the pins. Thus, if the holes in the printed circuit board are made only to accommodate the narrow dimension of the pins of the integrated circuit, then when the integrated circuit is positioned within the printed circuit or printed wiring board, the shoulder of the place where the dimension changes from a narrow to wide width of the pin can be used as the spacing aspect, assuming that the pins of the integrated circuit package are bent accurately.

FIG. 2a shows a normal, prior art, integrated circuit wherein the active cicuit chip element is on top of the integrated circuit bonding plate 134 in the housing 124 and the leads are bent away from this operative surface. In FIG. 2b is shown the integrated circuit of the present invention wherein the pins are bent toward the active optical sensor array 128 in the reverse position, and when the entire integrated circuit is inverted such that the pins 130 are pointed downward, the active optical sensor array surfaces also pointed downward and would be positioned on the printed wiring board 118 as seen in FIG. 3. In order to allow for the active optical sensor array surface 128 to be accurately positioned from the lens at the focal length thereof, the entire integrated circuit package can be made of clear plastic, of the type which could allow for accurate placement and distance from the lens to both the active optical sensor array and the surface of pad 22. Feet 132 in FIG. 3 can provide for an accurate placement of the bottom surface of housing 108 to be distanced from pad 122. The foot distance 132 from the pad to the lens can be taken into account in the design of the system if it is desired to have such feed 132.

It would be possible to incorporate lens 120 into the integrated circuit package; however, this would require custom molds and special handling of the new package shape. It is possible, however, as the compound used for encapulation of the integrated circuit package 124 is optically clear plastic and is similar to that used in prior art plastic lenses. In addition, higher orders of sophistication are achievable in that the optical source, prisms, integrated lenses, and registration pins and/or guides may also be incorporated into the custom plastic packages.

Since all alignment is to the printed wiring board asembly 118, it becomes feasible, and thus desirable, to make the total assembly of parts by snapping them together rather than using screws and plastic welds. One of the basic goals of the present invention was to create an inexpensive and accurate optical assembly which would be compatible with automated assembly and testing.

As stated above, in prior art integrated circuit packages, the chip die is on the top of the metal bonding plate. With the method of packaging as set forth herein, the chip die is mounted on the affected bottom of the plate, and since the active area is on the chip die, the method of packaging will allow for:

1. automatic integrated circuit sensor to lens alignment;
2. in line rather than folded optical path;
3. single layer printed wiring board assembly may be used;
4. automatic integrated circuit insertion may be used;
5. single lens fixed focus;
6. simplified illumination; and
7. reduced assembly steps and costs.

While the invention has been described with reference to specific embodiments, it will be understood by those skilled in the art that various changes may be made and equivalents may be substituted for elements thereof, without departing from the true spirit and scope of the invention. In addition, many modifications may be made without departing from the essential teachings of the invention.

What is claimed is:

1. A cursor control device, or optical mouse, comprising;

a housing assembly including at least top, side and bottom surfaces, a printed wiring board mounted horizontally within said housing, a hole of predetermined size formed in said printed wiring board, an integrated circuit package mounted on one side of said printed wiring board such that the active integrated circuit element thereof faces and is aligned with said hole, wherein said active integrated circuit element is mounted in a standard package and wherein the electric leads of said package are bent toward the surface of said integrated circuit where the active element thereof is mounted such that the integrated circuit package is effectively mounted upside down to its normal mounting configuration.

an optical guide mounted in said hole and in line with and immediately adjacent the active integrated circuit element of said integrated circuit package, a lens mounted at the end of said optical guide away from said active integrated circuit element, and light emitting means mounted adjacent said lens and said optical guide to illuminate an area a predetermined distance from said lens, wherein light reflected from said area is gathered and focussed by said lens through said optical guide onto said active integrated circuit element on said integrated circuit package.

* * * * *